(No Model.) 5 Sheets—Sheet 1.
G. H. RYAN.
WIRE NAIL MACHINE.
No. 365,944. Patented July 5, 1887.
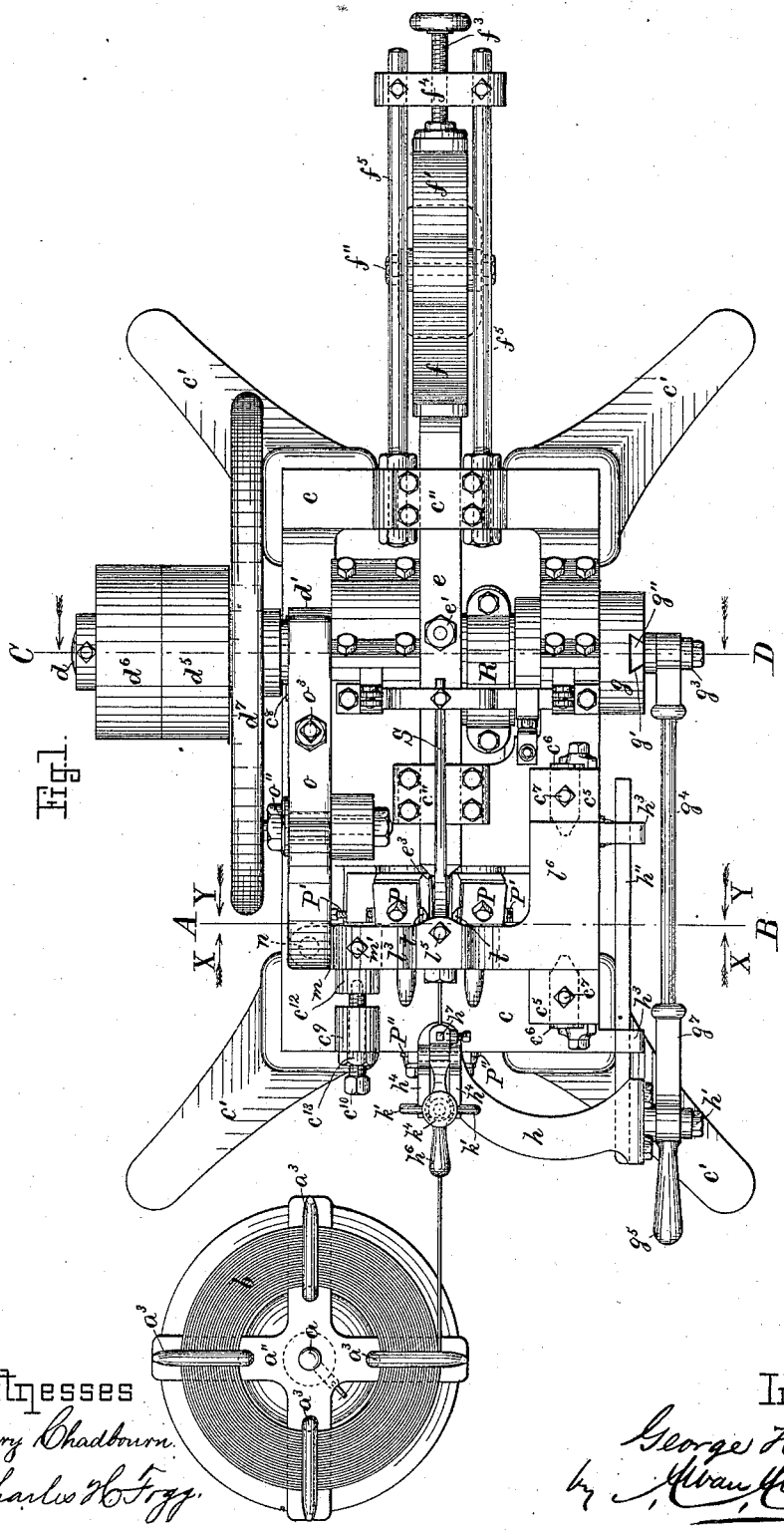

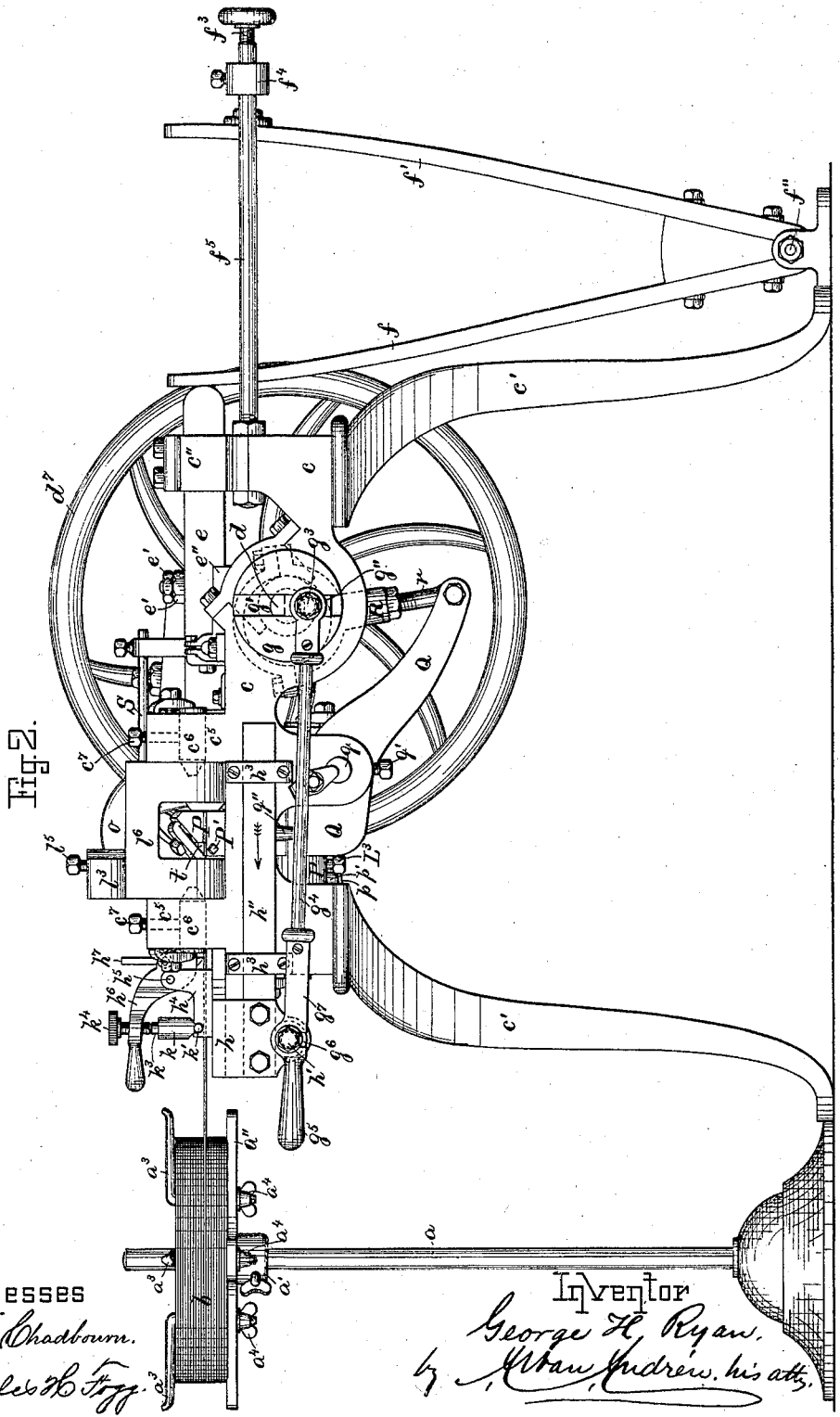

(No Model.) 5 Sheets—Sheet 3.
G. H. RYAN.
WIRE NAIL MACHINE.
No. 365,944. Patented July 5, 1887.
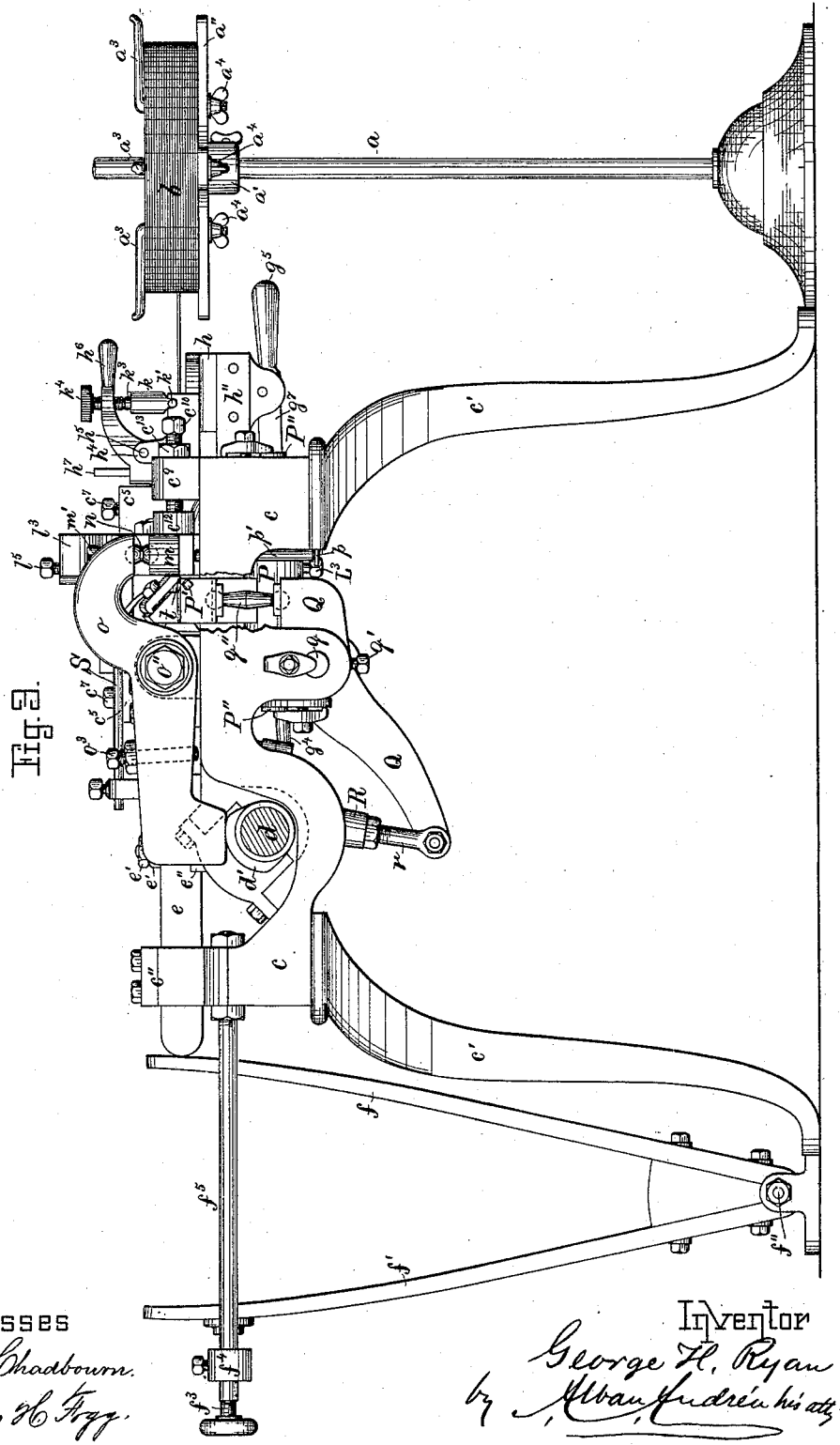
Witnesses
Henry Chadbourn.
Charles H. Fogg.
Inventor
George H. Ryan
by Alban Andrew his atty

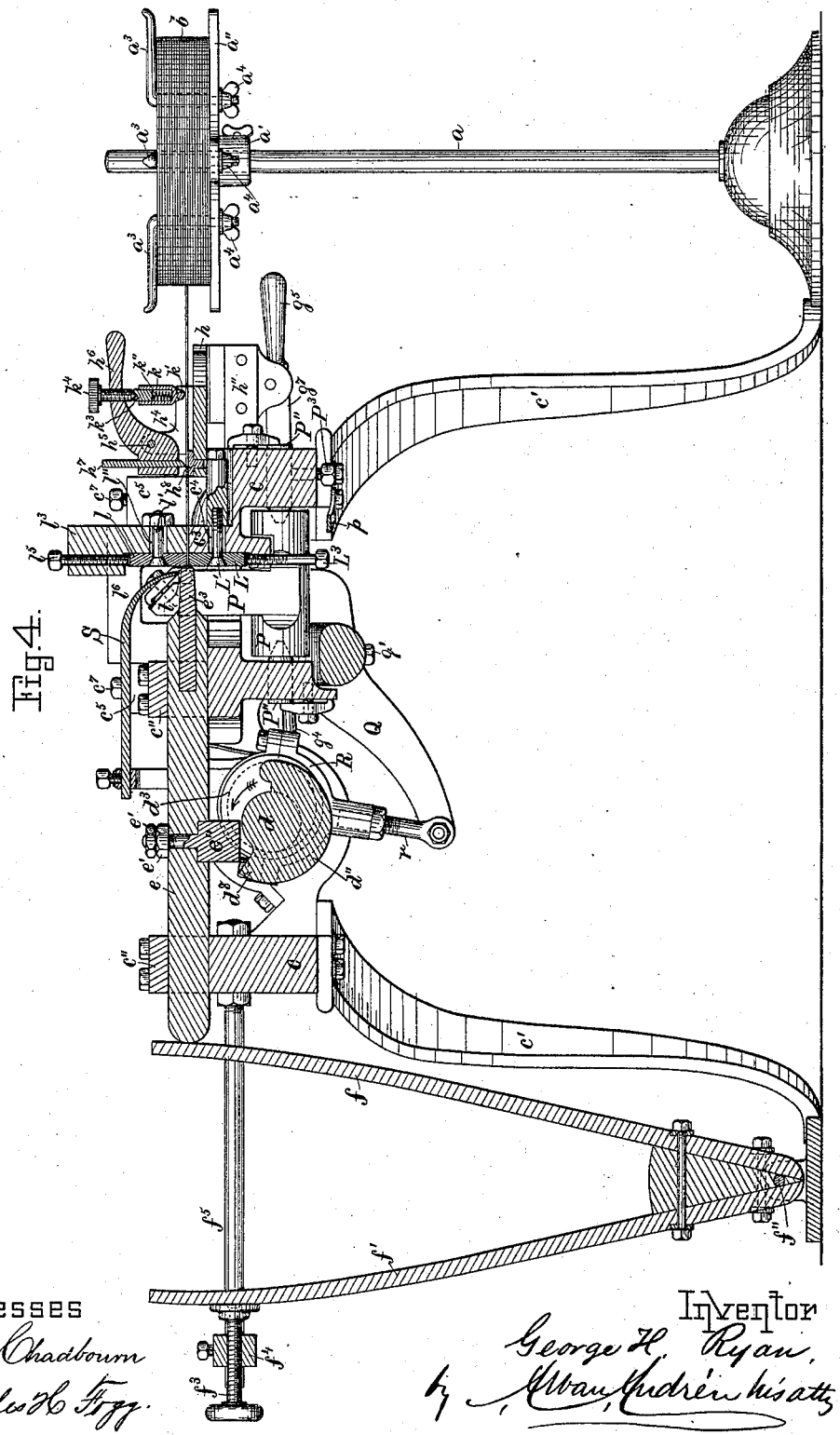

(No Model.)  5 Sheets—Sheet 5.
G. H. RYAN.
WIRE NAIL MACHINE.
No. 365,944. Patented July 5, 1887.
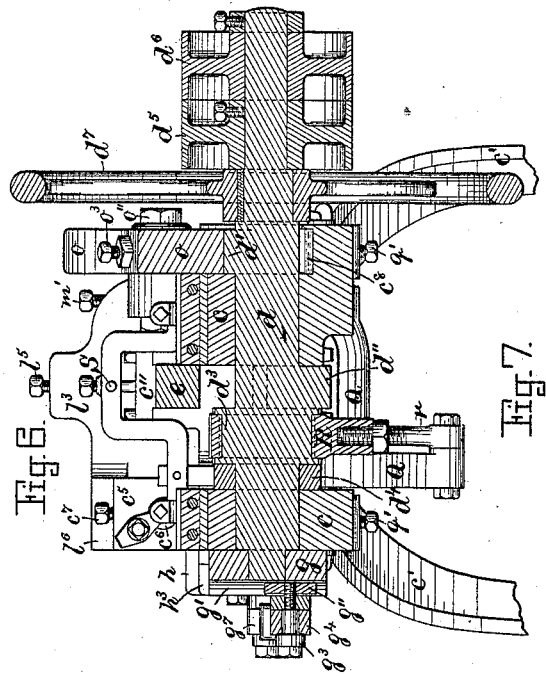
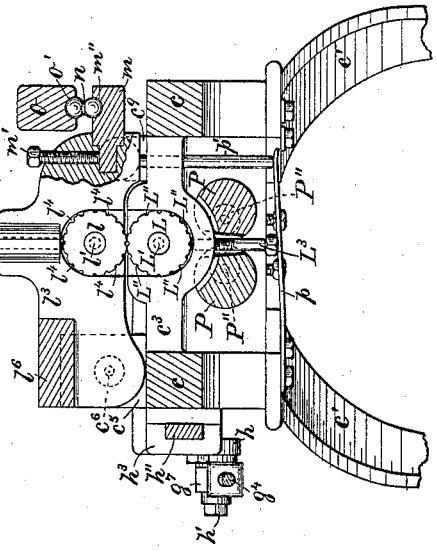
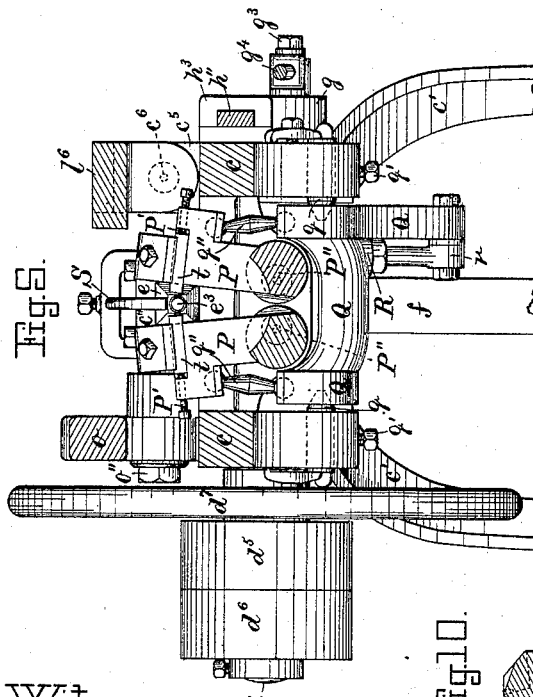
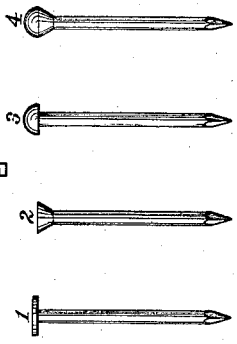
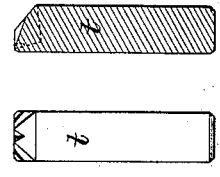
Witnesses
Henry Chadbourn.
Charles H. Fogg.
Inventor
George H. Ryan.
by Alban Andrew, his atty.

UNITED STATES PATENT OFFICE.

GEORGE H. RYAN, OF BROCKTON, MASSACHUSETTS, ASSIGNOR TO WILLIAM A. SWEETSER, OF SAME PLACE.

WIRE-NAIL MACHINE.

SPECIFICATION forming part of Letters Patent No. 365,944, dated July 5, 1887.

Application filed August 11, 1886. Serial No. 210,508. (No model.)

*To all whom it may concern:*

Be it known that I, GEORGE H. RYAN, a citizen of the United States, residing at Brockton, in the county of Plymouth and State of Massachusetts, have invented certain new and useful Improvements in Wire-Nail Machines; and I do hereby declare that the same are fully described in the following specification, and illustrated in the accompanying drawings.

This invention relates to improvements in machines for making wire nails; and it is carried out as follows, reference being had to the accompanying drawings, whereon—

Figure 1 represents a plan view of the machine. Fig. 2 represents a front elevation, and Fig. 3 represents a rear elevation, of the same. Fig. 4 represents a longitudinal section of the machine. Fig. 5 represents a cross section on the line A B in Fig. 1, as seen in the direction of the arrows X in said Fig. 1. Fig. 6 represents cross-section on the line C D shown in Fig. 1. Fig. 7 represents a cross-section on the line A B in Fig. 1, as seen in the direction of the arrows Y in said Fig. 1. Figs. 8, 9, and 10 represent, respectively, end and side views and longitudinal section of one of the pointing and cutting dies. Fig. 11 represents wire nails made on the machine.

Similar letters refer to similar parts wherever they occur on the different parts of the drawings.

To the floor in the work-room or other stationary object is secured the spindle or rod $a$, having an adjustable collar, $a'$, secured to it by means of a set-screw or similar device. Loosely journaled on the spindle $a$, and resting on the collar $a'$, is the spider or wire-reel support $a''$, on which is located the reel of wire $b$, the latter being held in place on the spider $a''$ by means of the bent arms $a^3$ $a^3$, secured in their lower ends to the spider $a''$ by means of thumb-nuts $a^4$ $a^4$, as shown in Figs. 2, 3, and 4. By loosening the thumb-nuts $a^4$ and turning the arms $a^3$ about one-half of a revolution the horizontal parts of said arms will be so located as to permit a reel to be placed on or removed from the spider $a''$, as may be desired. After the reel is placed on the spider the arms $a^3$ are swung outward and secured in position, as shown in Figs. 1, 2, 3, and 4.

$c$ is the frame of the machine, secured in a suitable manner to the legs $c'$ $c'$ $c'$ $c'$, as shown.

$d$ is the driving-shaft, located in bearings in the frame $c$, and provided with fast and loose pulleys $d^5$ $d^6$ and balance-wheel $d^7$. (Shown in Fig. 6.)

In one piece with the driving-shaft $d$ are made the cams or eccentrics $d'$, $d''$, and $d^3$. The shaft $d$ is cast and the cams $d'$, $d''$, and $d^3$ made chilled, so as to resist their wearing out and at the same time be immovable relative to the said driving-shaft.

The cam $d'$ is for the purpose of actuating the wire-gripping mechanism. The cam $d''$ actuates the wire-heading mechanism, and the eccentric $d^3$ actuates the cutting-off and nail-pointing mechanism, as will hereinafter be more fully described. In addition to said chilled cams or eccentrics cast in one piece with the driving-shaft $d$, there is secured to it the cam or eccentric $d^4$, for actuating the nail-clearing mechanism.

The heading mechanism for automatically heading the wire nail consists of the metal bar $e$, situated above the shaft $d$ and adapted to move longitudinally in guides $c''$ $c''$ on the frame $c$, as shown in Fig. 4, said bar having secured to it by means of nuts $e'$ $e'$ the block $e''$, that is actuated by the chilled cam $d''$, which as it rotates in the direction shown by arrow in Fig. 4 causes the bar $e$ to move backward against the influence of the wooden springs $f f'$, secured together in their lower ends, and pivoted at $f''$, as shown in Figs. 1, 2, 3, and 4, said springs serving to force the bar $e$ forward as soon as the lip $d^8$ on the cam $d''$ has passed by the block $e''$. The rear end of the bar $e$ lies in contact with the upper end of spring $f$, as shown, and the upper end of spring $f'$ rests against the inner end of the regulating-screw $f^3$, that is screwed through the yoke $f^4$, the latter being attached to rods $f^5 f^5$, secured to and extending from the rear of the frame of the machine, as shown in Figs. 1, 2, 3, and 4. By adjusting the screw $f^3$ the power of the springs $f f'$ can be regulated at pleasure.

In a longitudinal recess in the forward end of the bar $e$ is secured the header $e^3$, the front end of which may be made flat for heading nails 1 2, as shown in Fig. 11, or made cup-shaped for heading nails 3 4, as shown in said Fig. 11, or otherwise shaped, according to style of nail-heads desired. By removing the block $e''$ from the bar $e$ and substituting for it another of a different height the stroke on the bar $e$ is correspondingly changed.

The mechanism for automatically feeding the wire from the reel $b$ to the gripping mechanism is carried out as follows: To one end of shaft $d$ is secured the crank-plate $g$, having a groove, $g'$, in which is adjustable the block $g''$, to which the crank-pin $g^3$ is secured. To the said crank-pin is pivoted one end of the connecting or hooked feed-rod $g^4$, the forward end of which has a handle, $g^5$, and a slot or locking-notch, $g^6$, for connecting it to the bolt $h'$ on the feed-carrier $h$, so that the feed can be stopped instantly by lifting the rod, or the machine started without the feed, the latter being provided with a bar, $h''$, adapted to move forward and back in the stationary guides $h^3 h^3$, secured to the frame $c$, as shown in Figs. 1 and 2.

To brackets $h^4 h^4$ on the feed-carrier $h$ is pivoted at $h^5$ the lever $h^6$, to which is secured the feed-dog $h^7$, (shown in Fig. 4,) and below the latter is secured to the feed-carrier $h$ the feed-block $h^8$. (Shown in Fig. 4.)

$k$ is a sleeve having in its lower end horizontal projections $k' k'$, adapted to rest in corresponding notches or recesses in brackets $h^4 h^4$, as shown in Figs. 1, 2, 3, and 4, said sleeve having located within it the spring $k''$ and follower $k^3$. (Shown in Fig. 4.) The upper end of the follower $k^3$ is cup-shaped to receive the lower end of the pressure-screw $k^4$, that is screwed through the lever $h^6$. (Shown in Fig. 4.)

The grip on the wire between the lower end of the feed-dog $h^7$ and block $h^8$ can be regulated simply by turning the pressure-screw $k^4$ to the right or left, as may be desired.

The operation of the wire-feeding mechanism is as follows: When the feed-carrier $h$ is moved by the action of the crank $g^3$ and rod $g^4$ in the direction of the arrow shown in Fig. 2, the lower inclined end of the feed-dog $h^7$ will slip on the wire by reason of the yielding propensity of the lever $h^6$; but as soon as the carrier $h$ is moved in the opposite direction the spring $k''$, acting on the outer end of lever $h^6$, will cause the wire to be clamped firmly between the lower end of the pointed feed-dog $h^7$ and the little block or plate $h^8$, and thus the wire is fed forward a distance equal to the stroke of the feed-carrier $h$. The amount of feed is regulated by adjusting the block $g''$ in the groove in the crank-plate $g$. Should it be necessary for any reasons whatever to stop the feed of the wire during the running of the machine, this can be done simply by taking hold of the handle $g^5$ and lifting the latter far enough so as to disengage the bolt $h'$ from the recess $g^6$, and either to hold it in such inoperative position, or by moving the carrier $h$ forward and allowing the part $g^7$ of the rod $g^4$ to rest on top of bolt $h'$, by which the rod $g^4$ can move forward and back without imparting any motion to the carrier $h$. Another way of accomplishing the same object is to take hold of the horizontal projections $k' k'$ in the lower end of the sleeve $k$ and raise the latter against the influence of the spring $k''$ sufficiently to cause the projections $k' k'$ to be disengaged from the notches in brackets $h^4 h^4$, when the sleeve $k$ may be removed entirely or swung out of position into the angle of the brackets $h^4 h^4$, if so desired.

The gripping mechanism for automatically holding the wire while the same is cut and headed is carried out as follows: In one piece with the frame $c$, or secured thereto, is made the bridge $c^3$, to which is secured by means of a screw or bolt, $L'$, the lower adjustable gripper-die, L, which latter is preferably made cylindrical and provided with a series of peripheral grooves, $L''$, that may vary in size and form according to the size and shape of the wire that is being used in making the nails. The bolt $L'$ passes through a slotted perforation, $c^4$, in the bridge $c^3$, by which the die L is capable of a vertical adjustment, and after being adjusted to its proper position it is firmly secured to the bridge $c^3$ by the screw-bolt $L'$, as well as by the regulating thrust-screw $L^3$, that is screwed through the lower end of bridge $c^3$, and has its upper end resting against the under side of the die L, as shown in Figs. 4 and 7.

Directly above the die L is located the movable upper gripper-die, $l$, journaled on the screw-bolt $l'$, that is vertically adjustable in a slot-hole, $l''$, in the gripper-lever $l^3$, and provided with a series of peripheral grooves or recesses, $l^4$, and a vertically-adjustable thrust-screw, $l^5$, for the purpose of adjusting the position of said movable die $l$ relative to the lower die, L, according to the size of wire used in making the nails, so as to obtain a firm grip on the wire when the gripper-lever $l^3$ is depressed. The lever $l^3$ is arched in one end, as shown at $l^6$ in Figs. 1, 2, and 7, and there pivoted or hung to ears or projections $c^5 c^5$ on frame $c$ by means of pointed centers $c^6 c^6$, passing through perforations in the ears $c^5 c^5$, and entering conical recesses in the arched part $l^6$, as shown, by which great accuracy and steadiness in the motion of the gripper-lever are obtained, and the arched end $l^6$ further serves to receive one of the knife-levers that are arranged in close proximity to the rear side of the gripper-lever. $c^7 c^7$ are set-screws passing through the ears $c^5 c^5$, for securing the centers $c^6 c^6$ in place on said ears after being properly adjusted therein. To the free end of the gripper-lever $l^3$ is secured, by means of set-screw $m'$, the block $m$, the upper side of which is provided with a cup-shaped or semi-spherical recess, $m''$, (shown in Fig. 7,) in which fits one end of the ball-piece $n$, the other end of which fits into a similar cup-shaped or semi-spherical recess, $o'$, in the end of the rock lever $o$, that is pivoted at $o''$ to the frame of the machine, and having its rear end actuated by the chilled cam $d'$ on driving-shaft $d$, as shown in Fig. 3. The plug $m$ is made removable from the gripper-lever $l^3$, so as to enable the latter to be swung upward for the purpose of adjusting the dies and knives. Thus the gripper-lever $l^3$ is operated in one direction—that is, toward the wire—so as to hold it firmly between the dies $l$ L by means of the cam $d'$, and as soon as the latter ceases to act on the lever $o$ the wire held between the dies $l$ L is liberated by the influence of spring $p$, pressing on the vertically-movable rod $p'$, the upper end of which rests against the under side of the gripper-lever $l^3$, as shown in Fig. 7, and thus permits the feed of the wire to take place. In one piece with frame $c$ is cast a thrust projection, $c^9$, through which is screwed the thrust-screw $c^{10}$, its inner end fitting in a block, $c^{12}$, against which the gripper-lever $l^3$ is made to rest when the heading of the wire takes place. Said thrust-screw is provided with check-nut $c^{13}$. (Shown in Figs. 1 and 3.)

I make in the frame $c$, directly below the cam $d'$, a recess or oil-reservoir, $c^8$, (shown in Fig. 6,) that contains a suitable lubricant, in which the cam $d'$ dips once during its revolution, and thus automatically keeps the said cam properly lubricated. $o^3$ is a regulating-screw provided with a check-nut, as shown in Fig. 3, said screw being adjustably secured to lever $o$, its lower end serving as a stop against the top of frame $c$, and thereby to limit the spread of the gripper-lever $l^3$.

The mechanism for automatically cutting off and pointing the wire is carried out as follows: In Figs. 8, 9, and 10, the cutter $t$ is represented. There are a pair of these, and they are secured in a suitable manner, respectively, to the upper ends of the rock-levers P P, said levers having thrust-screws P' P' screwed through them to regulate the position of the cutters relative to each other and to their respective levers, as shown in Fig. 5. The levers P P are pivoted to and supported in their lower ends on the pointed centers P'', passing through perforations in the frame $c$, their inner ends projecting into tapering recesses in the lower ends of said levers, as shown in Fig. 4, said pointed fulcra P'' being secured in place by means of set-screws P³, as shown.

Below the rock-levers P P is pivoted, by means of pointed centers $q$ $q$, the pressure-lever Q, as shown in Figs. 2, 3, 4, and 5, said centers passing through perforations in the frame $c$ and having their inner ends projecting into tapering recesses in the lever Q and secured in place by means of set-screws $q'$ $q'$. Shown in Fig. 5.) The forward ends of the lever Q are connected to the respective knife-levers P P by means of the universally-jointed rods $q''$ $q''$, as shown in Fig. 5, by which arrangement a positive reciprocating or oscillating motion is imparted to the knives $t$ $t$ from the rock-lever Q. The rear end of lever Q is connected to the rod $r$, the upper end of which is adjustably secured to the ring R, that surrounds the eccentric $d^3$ on shaft $d$, and in this manner a positive forward and back motion to and from the wire to be cut and pointed is imparted to the knives $t$ $t$ from the driving-shaft by one cam or eccentric instead of two, as usually done. The faces of the cutters $t$, as shown in Figs. 8, 9, and 10, are such as to compress and form the points of the nails cut off from the wire, as shown in Fig. 11.

S in Fig. 4 is a clearing arm or finger for the purpose of automatically throwing off the finished nail in case the knives $t$ $t$ should happen not to entirely cut through the wire, and said clearing-finger is oscillated or reciprocated by means of suitable intermediate connecting mechanism from the cam or eccentric $d^4$, as is common in machines of this kind. By means of the movable pointed centers $c^6$ $c^6$ and P'' P'' a proper adjustment of the dies and cutters relative to each other is obtained.

The operation of the machine is as follows: The wire is intermittently fed forward between the gripper-dies $l$ L by the feed mechanism, as above described, and after being fed forward the desired distance the wire is firmly clamped between the said dies $l$ L by the mechanism, as described, and while being held in said dies the wire is pointed and cut off by the cutters $t, t$, and the remaining portion of the wire end is headed by the blow from the header $e^3$, after which the wire is released from between the dies $l$ L, a nail-length of wire is automatically fed forward, and the dies $l$ L made to close upon and hold the wire in place, after which the headed nail is pointed and cut off by the action of the cutters $t$ $t$ and allowed to drop down through the machine, or detached by the action of the clearer S, if found necessary, after which successive portions of the nail-wire are headed, fed forward, pointed, cut off, and delivered, as above set forth and described.

Having thus fully described the nature, construction, and operation of my invention, I wish to secure by Letters Patent and claim—

1. In a wire-nail machine, the soft cast-iron shaft $d$, having the chilled cams or eccentrics $d'$, $d''$, and $d^3$, made in one piece with it, combined with the lever $o$, the bar $e$, and lever Q, for the respective operation of the wire-clamping mechanism, the heading mechanism, and wire-nail cut-off mechanism, as and for the purpose set forth.

2. In a wire-nail machine, the wire-feeding mechanism, as described, consisting of the reciprocating carrier $h$ and its brackets $h^4$, the lever $h^6$, pivoted to said brackets and having secured to it the feed-dog $h^7$, and the sleeve $k$, having the horizontal projections $k'$ $k'$, resting in recesses in brackets $h^4$, the spring $k''$ and follower $k^3$, arranged within said sleeve $k$, with the adjustable screw $k^4$, screwed through the lever $h^6$ and pressing on the follower $k^3$, all arranged, combined, and made to operate substantially as and for the purpose set forth.

3. In a wire-nail machine, the gripping device, as described, consisting of the adjustable die L, pivoted to bolt L', and provided with the thrust-screw $L^3$, combined with the adjustable die $l$, pivoted to bolt $l'$ in the movable gripper-lever $l^3$, and having a corresponding thrust-screw, $l^5$, hung on two centers, as and for the purpose set forth.

4. In a wire-nail machine, the driving-shaft $d$ and its cam $d'$, the rock-lever $o$, actuated by said cam $d'$, and the gripper-lever $l^3$, having the arched end $l^6$, pivoted by means of the adjustable pointed centers $c^6$ $c^6$ to the frame $c$, and connected to the lever $o$ by means of the ball-piece $n$ and cupped piece M, in a manner and for the purpose as set forth.

5. In a wire-nail machine, the movable gripper-lever $l^3$, in combination with the thrust projection $c^9$, its thrust-screw $c^{10}$, and block $c^{12}$, as and for the purpose set forth.

6. In a wire-nail machine, the cutter-levers P P, pivoted to the frame $c$, as described, and having secured in an adjustable manner to their upper ends the cutters $t$ $t$, combined with the driving-shaft $d$ and its eccentric $d^3$, the ring R, connecting-rod $r$, and lever Q, pivoted to it and adapted to rock on the adjustable pointed centers $q$ $q$, whereby one eccentric or cam does the work usually done by two, and connected to the cutter-levers P P by means of the universally-jointed rods $q''$ $q''$, as and for the purpose set forth.

7. In a wire-nail machine, the rocking gripper-lever $l^3$, having its arched end $l^6$ pivoted to the frame $c$, and provided in its other end with the removable plug $m''$, combined with the lever $o$ and connection $n$, as and for the purpose set forth.

In testimony whereof I have affixed my signature in presence of two witnesses.

GEORGE H. RYAN.

Witnesses:
SAMUEL W. S. HOWARD,
JOHN D. WHITE.